Feb. 17, 1948. E. WILDHABER 2,436,276
VARIABLE LEVERAGE GEARING
Original Filed Dec. 31, 1940 4 Sheets-Sheet 1

Inventor
ERNEST WILDHABER
By
Attorney

Feb. 17, 1948. E. WILDHABER 2,436,276
VARIABLE LEVERAGE GEARING
Original Filed Dec. 31, 1940 4 Sheets-Sheet 2

Inventor
ERNEST WILDHABER
By
Attorney

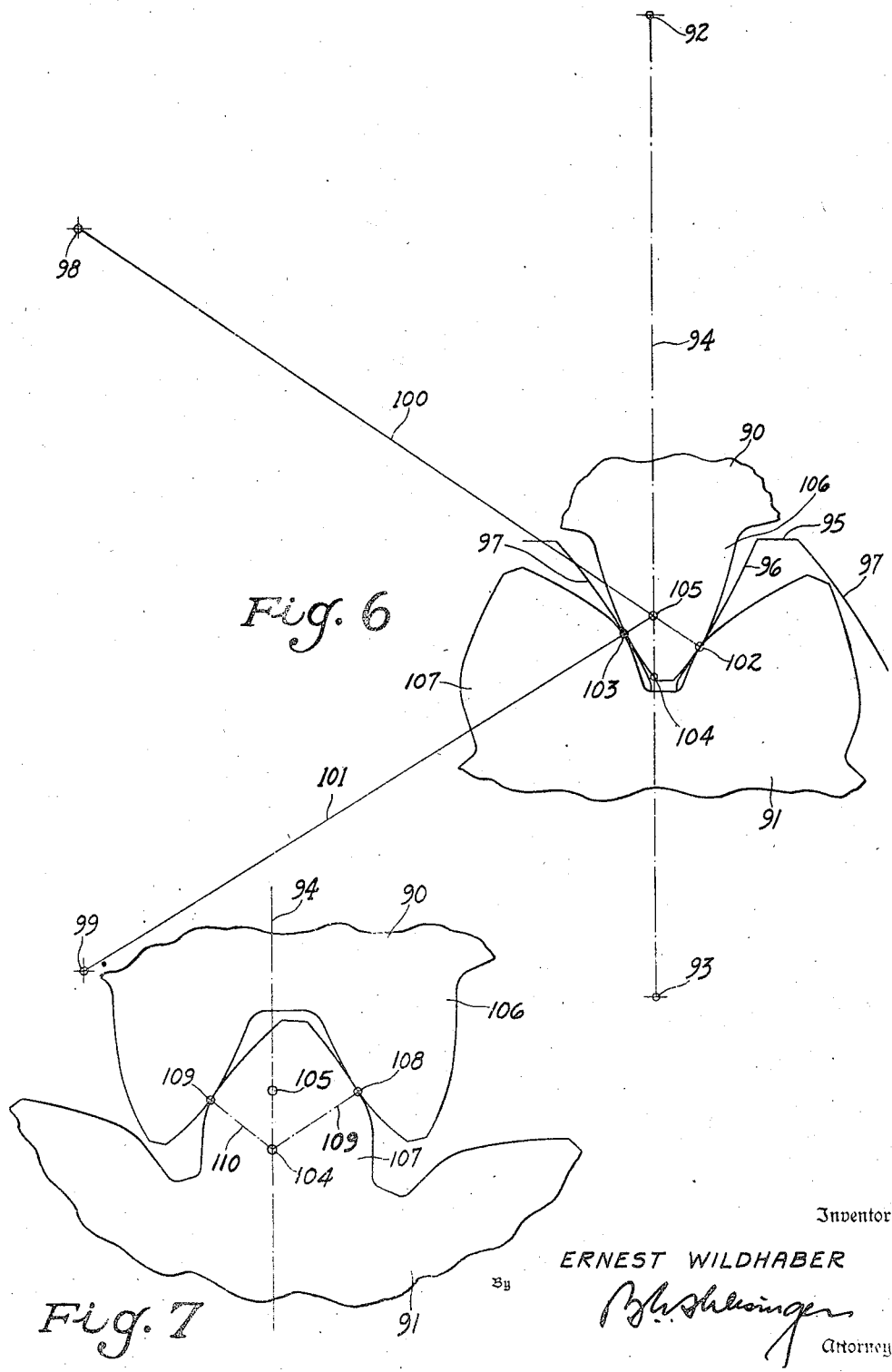

Feb. 17, 1948.  E. WILDHABER  2,436,276
VARIABLE LEVERAGE GEARING
Original Filed Dec. 31, 1940   4 Sheets-Sheet 4
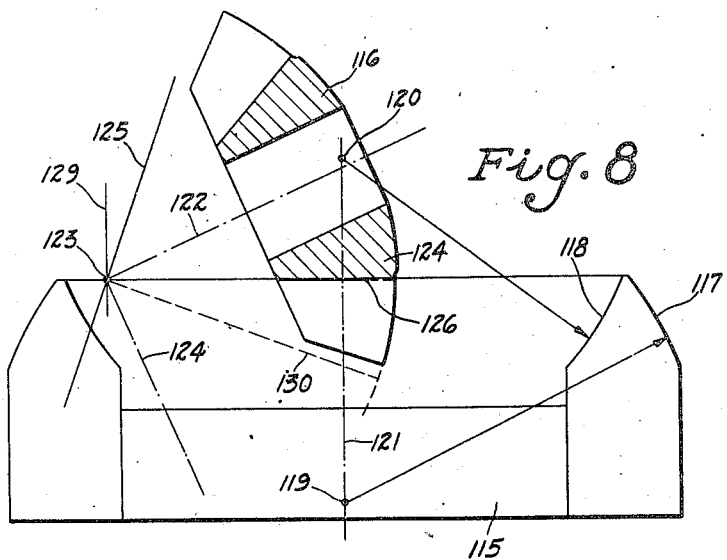
Fig. 8
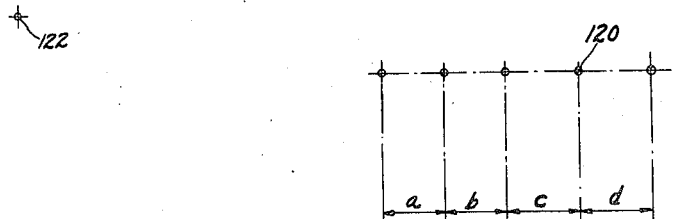
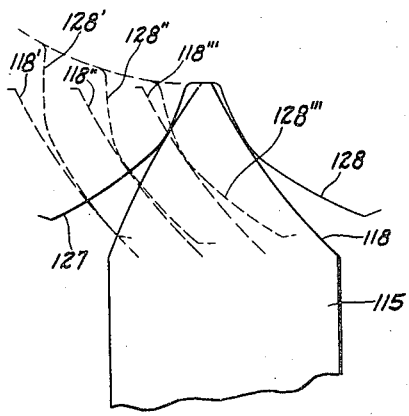
Fig. 9
Inventor
ERNEST WILDHABER
Attorney Patented Feb. 17, 1948

2,436,276

UNITED STATES PATENT OFFICE 2,436,276

VARIABLE LEVERAGE GEARING

Ernest Wildhaber, Brighton, N. Y., assignor to Gleason Works, Rochester, N. Y., a corporation of New York Original application December 31, 1940, Serial No. 372,473. Divided and this application February 13, 1943, Serial No. 475,725. In Great Britain December 31, 1941

19 Claims. (Cl. 74—459.5)

The present invention relates to gears for transmitting non-uniform motion and to methods of producing such gears, and particularly to varying-leverage gears and to methods of producing them. This application is a division of my Patent No. 2,372,240 which covers specifically the novel method of my invention. The present application is directed to the new form of gears.

Varying-leverage gears are so-called because the mating tooth surfaces of the gears are so formed that, as the gears rotate together, a periodic variation between the gears in leverage or torque ratio will occur. Such gears have been used for some years particularly in the differential mechanisms of trucks and tractors, where it is desirable to provide some means for preventing complete loss of traction when one of the drive wheels slips. In a differential in which such gears are used, if the tractive power of one wheel is diminished due to slipping, the power transmitted to the other wheel will be periodically increased. This periodic increase in power is intended to enable the truck or tractor to pull itself out of the mud or snow in which it may have become mired.

Both spur and bevel gears may be provided with varying-leverage tooth shapes, but since bevel gears are mostly employed in automotive differentials, varying-leverage tooth shapes have been applied principally to bevel gearing. The varying-leverage effect is obtained by making the tooth profiles with distinctly different portions of large and small curvature, respectively.

In the previously known form of varying-leverage gears, each tooth profile has had a portion of large radius of curvature extending for the greater portion of the height of the tooth and a portion of much smaller radius of curvature extending for only a very short portion of the height of the tooth adjacent the tip of the tooth. When these prior-type varying-leverage gears roll together, the short portion near the tip of each tooth has a maximum of sliding contact with the tooth surfaces of the mating gear and hence tends to wear away, so the gears gradually lose their varying-leverage characteristic.

The previously known tooth form has had the additional disadvantage that it takes practically twice as long to generate the short abruptly-curved portion at the tip of the tooth as it does to generate the main portion of the tooth profiles. Further than this, the previously known tooth form has been such that it either was required to generate only one side of the teeth at a time or to use two different generating motions for generating the two sides of the teeth. When one side of the gear teeth was cut at a time, it took longer to produce the gears than standard uniform motion differential gears, and the cost of producing these varying-leverage gears was increased accordingly over uniform-motion gears. Where two sides were generated at a time, increased complications were introduced into the generating machine and the cost of these machines was increased correspondingly. The difficulty has been that while there exists a basic rack or crown gear to which uniform-motion spur or bevel gears may be generated conjugate, there has heretofore existed no corresponding basic rack or crown gear for varying-leverage gears, and accordingly it has been impossible to generate such gears two sides simultaneously with the same generating motion.

A further disadvantage of the previous form of varying-leverage gears has been that they have had to be made to have theoretically full length tooth contact and have, therefore, been unable to accommodate themselves to the variations in mounting and loads that are encountered in the use of differential gears. If the gears are not correctly mounted, the whole load may be thrown to one end or the other of the teeth and this will only cause them to wear the more rapidly.

For all of these reasons, varying-leverage gears have heretofore been used only in drives where high tractive ability is a basic consideration and the life of the gears, their cost of production, etc. are relatively minor factors.

One object of the present invention is to provide a new tooth profile shape for varying-leverage gears in which the more curved portion of the tooth profile is so located that when the gears are run in mesh, these more curved portions of the tooth profiles will have a minimum amount of sliding action and the gears will therefore have longer life.

Still another object of the invention is to provide a new tooth profile shape for varying-leverage gears which may be rolled out with a minimum amount of generating roll so that the tooth profiles may be generated in less time than with prior varying-leverage tooth shapes.

A further object of the invention is to provide a tooth shape for varying-leverage gears which may be produced in a generating process based on the use of a basic generating member such as a rack or crown gear.

Still another object of the invention is to provide a novel tooth shape for varying-leverage gears which will be conjugate to a basic generating member whose tooth profiles have no variation in curvature, being simple lines, preferably circular arcs or straight lines.

Another object of the invention is to provide a novel tooth shape for varying-leverage gears which may be generated conjugate to a basic gear having spherical or plane tooth surfaces.

A further object of the invention is to provide a tooth shape for varying-leverage gears that can be generated conjugate to the teeth of a basic rack or crown gear that is of such form that contact between the basic generating rack or crown gear and the two members of a pair of mating varying-leverage gears occurs along the same lines as between the two gears themselves.

Another object of the present invention is to provide varying-leverage gears which will mesh with localized tooth bearing. To this end, I propose to employ for the first time teeth that are curved longitudinally. I have found that the varying-leverage effect will still be retained in spite of the lengthwise curvature of the teeth.

Longitudinally curved teeth have been proposed heretofore at various times for differential gears, but only in connection with uniform-motion tooth profile shapes and teeth curved lengthwise at very high spiral angles for the purpose of obtaining a semi-locking effect. I propose to make the new varying-leverage differential gears with teeth of zero or relatively low spiral angle.

Bevel gears theoretically should be provided with teeth tapering in depth from end to end. Where they are cut with a face-mill gear cutter, however, such as is ordinarily employed in the cutting of longitudinally curved tooth bevel gears, the mating tooth surfaces produced will not match exactly and the gears will have a "bias bearing" when run in mesh, that is, a bearing or contact which extends diagonally of the tooth surfaces from the top of the tooth at one end to the bottom of the tooth at the other end. Such a form of bearing is objectionable because it causes noise and improper distribution of the tooth loads.

A further object of the present invention, therefore, is to provide a form of varying-leverage gearing having longitudinally curved teeth which will mesh without "bias bearing."

Still another object of the invention is to provide varying-leverage tooth shapes which may be cut practically with face mill gear cutters having outside cutting edges of convex spherical form and inside-cutting edges of concave spherical shape.

A still further object of the invention is to provide a novel tooth form for varying-leverage gearing that may be generated at sufficiently low cost in large volume to permit the use of such gearing in all types of automotive vehicles.

Other objects of the invention will be apparent hereinafter from the specification and from the recital of the appended claims.

In the drawings:

Fig. 6 is a diagrammatic view similar to Fig. 3, illustrating a further embodiment of the invention and showing how a pair of gears may be provided with tooth profiles conjugate to a crown gear having spherical tooth surfaces;

Fig. 7 is a diagrammatic view, showing the gears of Fig. 6 in another meshing position; and Figs. 8 and 9 are diagrammatic views, illustrating the preferred method of producing gears according to the present invention.

As has already been indicated, in prior forms of varying-leverage gearing, the tooth profiles were composed of two distinctly different curves, one extending for the greater portion of the height of a tooth and being of greater radius of curvature, and the other lying adjacent the top of the tooth and being of the smaller radius of curvature. In gears made according to the present invention, the variation in leverage is again obtained by making each tooth profile a composite of distinctly different curves. In the present case, however, the portion of the tooth profile adjacent to the pitch line is made of small radius of curvature and the portions of the profile above and below the pitch line portion are made of larger radius of curvature. This new profile shape will produce the desired variation in leverage and it has the advantage that the portion of the tooth profile which is most curved is located at the pitch line where the least sliding, and therefore the least wear, will take place. Hence the gears will have longer life.

The new tooth shape may be used for either spur or bevel gears. It has the advantage that it may be generated conjugate to a basic rack or crown gear whose tooth profiles have no variation in curvature, being simple lines, either straight or curved. The desired tooth shapes may be produced by rolling the gear blank relative to the cutting tool or tools at a varying ratio as though the gear, which is being cut, were meshing with the basic generating gear which is represented by the tools.

The basic generating gear used in the generation of the tooth profiles has an undulating pitch surface. A prime advantage of the use of this basic member is that two sides of the teeth of a gear may be cut simultaneously with a tool having straight-sided cutting edges or curved cutting edges of single curvature.

Where bevel gears are to be produced, it is preferred to cut them with a face-mill gear cutter having spherical side-cutting edges. With such a cutter it is possible to generate the gears without bias bearing. It is also preferred to cut the gears with teeth of zero spiral angle, that is, with curved teeth which have such longitudinal direction that a cone element of the gear is tangent to the longitudinal center line of the tooth at a point midway the length of the tooth. When the gears are cut with a face-mill gear cutter, it is possible to provide different radii of curvature on the mating tooth surfaces of a pair of gears so as to obtain a localization of tooth bearing or contact between such surfaces, and thus enable the gears to accommodate themselves readily to variations in mountings and loads.

Reference will now be had to the drawings for a more detailed description of my invention.

Figure 1:
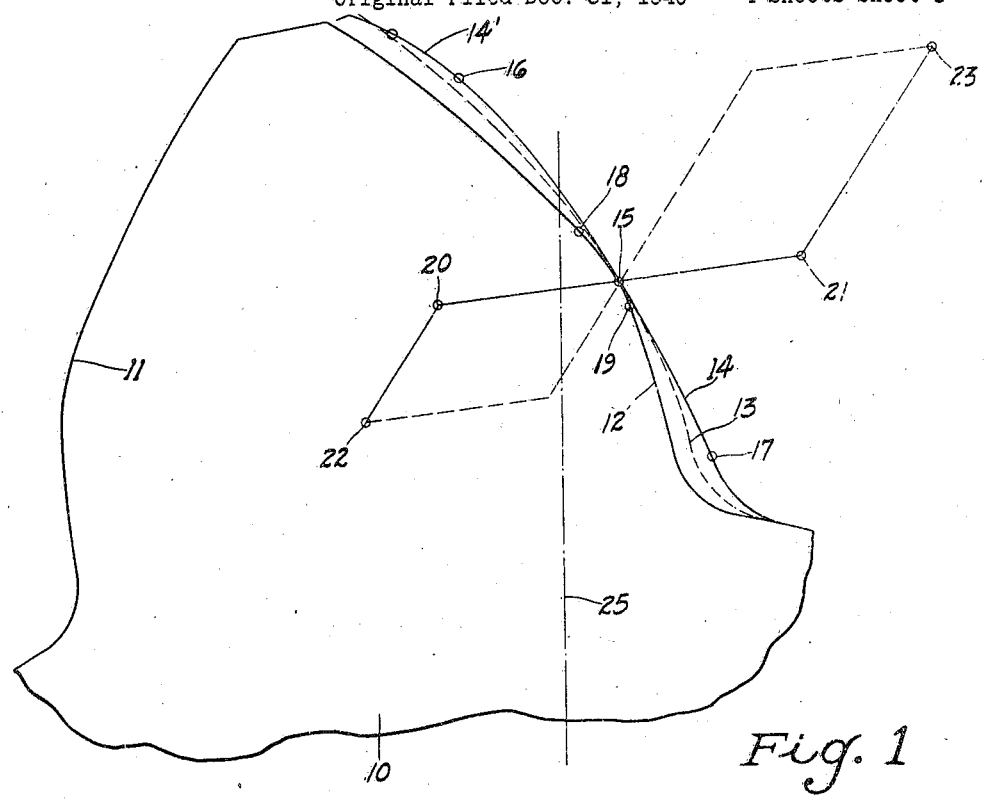
Fig. 1 is a more or less diagrammatic view, showing the shape of a pinion tooth of a given pressure angle made according to one embodiment of the present invention, and illustrating, for the purposes of comparison, the profile shapes of an involute tooth and of the prior form of varying-leverage tooth, which are of the same pressure angle as the new tooth.

In Fig. 1, I have shown a pinion tooth 10 having opposite side tooth surfaces 11 and 12, respectively, shaped according to this invention. For the purposes of illustration and comparison, I have also shown at the right hand side of the figure, the tooth profile of a corresponding involute pinion and of a pinion constructed according to one previously known type of varying-leverage gearing. The involute pinion profile is denoted by the dash lines 13 and the profile of the previously known type of varying leverage gearing is denoted at 14. The three profiles are of the same pressure angle measured at common point 15 and are tangent to one another at this point.

The involute profile 13 is, of course, suited to transmit uniform motion and is conjugate to a straight sided rack or crown gear. The profile 14 of the previously known type of varying-leverage gearing is much less curved than the involute profile 13 up to a point 16 and therefore this portion of the known tooth profile 14 extends entirely outside of the involute 13 on both sides of the point of contact 15. At point 16, however, the profile 14 becomes abruptly more curved so that the top portion 14' of the profile bends toward the involute 13. The tooth profile 14 of the prior type of varying-leverage gearing is, therefore, composed of two distinct and different portions, one less curved and one more curved than a corresponding involute tooth profile of equal pressure angle or inclination.

The top portion 14' of the prior type of varying-leverage tooth will, when run in mesh with a mate varying-leverage gear, mesh with the comparatively flat portion of the mating gear profile and on its short length will change its inclination about twice as much as the less curved main portion of the profile 14. In other words, the normals at the profile ends of the small portion 14' include an angle about twice as large as the one included by the normals at the profile ends 16 and 17 of the main portion of the tooth profile. In generating the prior type of varying-leverage gearing, then, the blank will have to turn through an angle about twice as large, while the top portion 14' of the pinion tooth is being generated, as the angle through which the blank must be turned while the main portion of the profile is being generated. Hence it takes about twice as long to cut the little top portion of the profile of the prior form of varying-leverage tooth as it does to cut the main tooth profile.

As will be seen from Fig. 1, the profile 12 of a pinion tooth made according to the present invention extends entirely inside of the involute profile 13. The portion of the profile between the points 18 and 19 is more curved than the involute profile 13, but the portions below the point 19 and above the point 18, respectively, are less curved than the corresponding portions of the involute profile. The more curved portion of the profile 12 has been placed near the middle of the height of the tooth and not at the upper end of the tooth as was the case with the prior form of varying-leverage gearing.

To illustrate the meshing action of a tooth made according to the present invention, I have shown in Fig. 1 the line of action for the tooth profile 12. This line, of course, is the path of the points of contact between the profile 12 and the profile of a mating gear when the pair are rolled in mesh. The line of action passes through the mean point 15. For the central portion 18—19 of the tooth, the line of action has a small inclination and extends from the point 20 to the point 21. The end portions 21—23 and 20—22 of the line of action have an increased inclination and correspond to the profile portions above the point 18 and below the point 19, respectively.

The invention is not confined, of course, to the use of tooth profiles which have straight lines of action, as shown. The tooth profiles may be so constructed that the lines of action will be curved, and the sharp corners shown at points 20 and 21 in Fig. 1 may be rounded out up to the point where the whole line of action forms one continuous line with a point of inflection at or near the point 15.

In gearing constructed according to the present invention, the normals to the tooth profile at the points of contact intersect the line of centers 25 not in a single point, as in uniform motion gearing, but in points spaced up and down the line 25. These points are points of the shifting instantaneous axis, and they characterize the change in torque ratio or leverage that occurs when the gears are rotating together. In the case of the pinion shown in Fig. 1, the extreme torque ratios are obtained at points 20 and 21 of the line of action.

Opposite side tooth surfaces of involute gears can, of course, be generated two sides simultaneously, for in involute gearing a basic member, such as a rack or crown gear, with infinitely thin tooth sides can be imagined as interposed between a meshing gear pair so that at all times the two gears of the pair are in contact with the said basic member along the same lines as they contact with one another. This basic member is made the basis of involute gear production. Its tooth sides are chosen as single and simple surfaces so that a tooth surface of the basic member can be described by tools having straight-sided cutting edges or cutting edges of single curvature. Opposite side tooth surfaces of an involute gear may then be produced simultaneously by a generating motion in which the gear, that is to be produced, is rolled relative to the cutting tool or tools as though it were meshing with the basic member.

There has been no simple basic member, however, to which opposite sides of the teeth of prior types of varying-leverage gears were conjugate. It has therefore been impossible to generate opposite sides of the teeth of such gears with the same generating motion. Sparate generating motions have had to be used for producing opposite sides fo their teeth. I have found, however, that basic members can be determined for varying-leverage gears constructed according to the present invention. Thus I have found a method of cutting both sides of the teeth of the new varying-leverage gears with the same generating motion.

Figure 3:
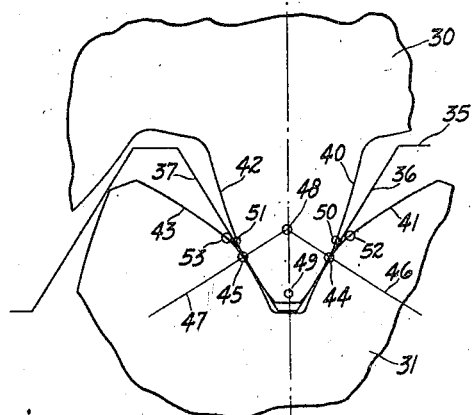
Fig. 3 is a diagrammatic view, illustrating the tooth shapes of a pair of gears made according to one embodiment of the present invention and showing that both members of the pair may be made conjugate to a basic rack or crown gear having plane tooth sides.

In Fig. 3, I have shown a gear 30 and a pinion 31 made according to one embodiment of this invention in mesh. The axes of the pair are at 32 and 33, respectively, and 34 denotes the line of centers of the pair. In this embodiment of the invention, both the gear 30 and the pinion 31 have symmetrical teeth.

In the position of mesh shown in Fig. 3, a tooth of the gear 30 is symmetrical with reference to the central plane 34 containing the axes of the gears. Contact between the mating sides 40 and 41, and 42 and 43, respectively, of the teeth of the gear and pinion, is at points 44 and 45 for the position shown, assuming that there is no backlash between gear and pinion. The normals 46 and 47 to the tooth profiles at points 44 and 45, respectively, then intersect the central plane 34 in point 48 which represents the topmost position of the instantaneous axis of motion between the teeth. The lowest position 49 of the instantaneous axis is attained when one of the pinion teeth is in a position symmetrical to the center line 34, that is, after gear and pinion have rotated together through one half a pitch. It should be noted that the more curved portions 44—50 and 45—51 of the gear teeth will mesh with the more curved portions 44—52 and 45—53 of the pinion teeth.

I have found that the tooth surfaces of both gear 30 and pinion 31, may be generated conjugate to a basic rack or crown gear 35 having plane tooth sides 36 and 37. Thus a motion can be imparted to a rack or crown gear 35 such that contact between the rack or crown gear and the two gears 30 and 31 occurs along the same lines as between the two gears themselves at any positions of contact. This can be achieved by effecting a rolling motion at a varying ratio between the tools, which represent the rack or crown gear, and the gear blank during cutting, the variation in ratio during generation corresponding to variation in ratio between the gears themselves as they rotate in mesh. The motion of the rack or crown gear and the gears 30 and 31, in other words, is so interrelated that each combination has the same shifting instantaneous axis at all times. We may assume the shift of the instantaneous axis in terms of displacement of the rack or crown gear. As the rack moves through one pitch, the gears 30 and 31 are moved at each instant at a rate determined from the position of the instantaneous axis. Corresponding positions may be computed with the known means in the art.

Figure 4:
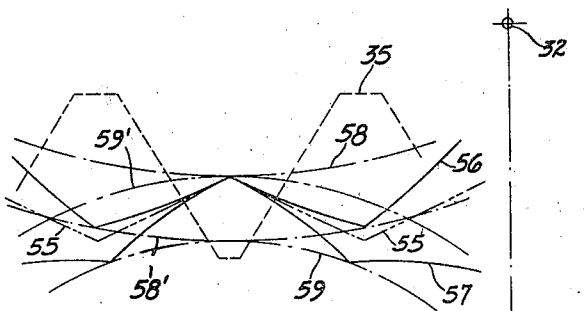
Fig. 4 is a diagrammatic view showing the undulatory forms of the pitch lines of these gears and of the basic gear to which the gears are generated conjugate.

The basic generating gear 35 used for generating gear 30 and pinion 31 has, then, an undulatory pitch surface 55, as shown in Fig. 4, the extent of whose undulations is determined by the amount of shift of the instantaneous axis of the gears in mesh. The pitch surfaces of the gears 30 and 31 are also undulatory surfaces as denoted at 56 and 57, respectively. The lines 58 and 58' denote the minimum and maximum positions of the instantaneous centers of the gear away from the gear axis, while the lines 59 and 59' denote the minimum and maximum positions of the instantaneous centers of the pinion away from the pinion axis. The lines 58 and 58' and 59 and 59' denote in other words the minimum and maximum positions of the pitch lines of gear and pinion, respectively.

It will be noted that the undulations of the pitch surfaces of gear and pinion and basic rack correspond to the pitch of the teeth and that the portion of the profile of a gear or pinion tooth which is in action during rotation of the pair of gears through one pitch may be rolled out and generated by motion of the basic rack or crown gear 35 through one pitch. Much more roll is required when rolling out the previously known type of varying-leverage gearing with a straight sided rack or crown gear profile, and of course with the previously known form of gearing, it is impossible, as already stated, to generate two sides of the teeth simultaneously from the same basic rack with a practical tool.

Figure 2:
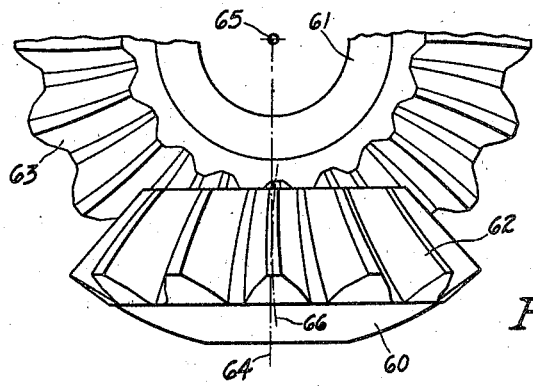
Fig. 2 is a fragmentary plan view of a pair of longitudinally curved tooth bevel gears made according to one embodiment of the present invention.

The present invention may be used for spur gears and also for straight bevel gears. In the case of bevel gears, however, it is preferred to make them with longitudinally curved teeth. Fig. 2 shows such a pair of bevel gears made according to the present invention. In the pair shown, the pinion 60 and the mate gear 61 have longitudinally curved teeth 62 and 63, respectively. These teeth are preferably so curved longitudinally that a line 64 radial of the common apex 65 of the gears will be tangent to the median center line 66 of a tooth at a point midway the length of the tooth. The advantage of longitudinally curved tooth gears is that the mating tooth surfaces of the two members of the pair may be cut with different radii of lengthwise curvature so that they will have less than full length contact and have a localization of bearing which is desirable in bevel gears.

A straight-sided basic member, such as shown at 35 in Fig. 3, may be used as the basic member in generating a pair of spur gears or a pair of straight bevel gears according to the present invention, or even in generating longitudinally curved tooth bevel gears provided the teeth are of uniform depth from end to end. It is preferable in bevel gearing, however, to have the teeth taper in depth from end to end.

In the production of longitudinally curved tooth bevel gears, however, there is danger of "bias bearing" where the gears are cut with face-mill cutters of straight tooth profile, that is, with face-mill cutters having conical cutting surfaces. The mating tooth surfaces will not match and the lines of contact between the mating tooth surfaces will extend diagonally of the teeth from one end to the other, thus causing the "bias bearing" condition.

Figure 5:
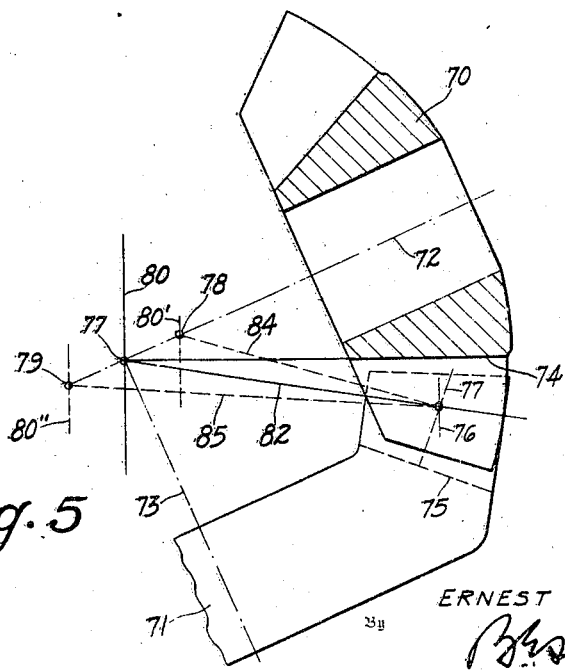
Fig. 5 is a diagrammatic view, illustrating certain of the problems encountered in production of longitudinally curved tooth gears that have teeth of tapering depth from end to end.

The difficulty which arises is illustrated in Fig. 5. Here 70 denotes a bevel pinion of standard involute form and 71 is the mate gear. The axes of gear and pinion are located at 72 and 73, respectively. 74 and 75 denote, respectively, the root lines of mating teeth of gear and pinion. In order to cut teeth of tapering depth on the two gears, the face-mill gear cutters employed in cutting their tooth surfaces must have their projected axes at right angles to the root surfaces of the gears. Hence, the cone elements 76 and 77, respectively, of the cutting surfaces will be perpendicular to the root lines 74 and 75, respectively, and will include an angle with each other equal to the taper between the root lines 74 and 75. For this reason, the two conical cutting surfaces of the gear cutter and of the pinion cutter, respectively, cannot match each other. Accordingly, the tooth surfaces produced by the two cutters do not match each other sufficiently.

In the respects noted the problem in the case of gears of varying leverage is the same as the problem for uniform motion gears. In the case of uniform motion gearing, however, there are several different ways of avoiding the "bias bearing" condition. For instance, the tooth surfaces can be matched to the desired extent, and bias bearing avoided, by modifying the generating motion during the production of the tooth surfaces. For instance, in the generation of the pinion, the axis 80 of the basic generating member, which is embodied by the cradle of the generating machine, may be so positioned that it does not pass through the apex 77 but will intersect the pinion axis 72 in some point 78 for one side of the pinion teeth and in some point 79 for the other side of the pinion teeth. In other words, for one side of the pinion teeth, the axis of the basic generating gear may be at 80' and for the opposite side of the teeth the axis of the basic generating gear may be at 80".

The points 78 and 79 are spaced from one another on opposite sides of the apex 77. To cut the correct tooth profiles, the ratio of roll between gear and cutter is changed so that instead of the instantaneous axis of generation being at 82 it will be at 84 for one side of the teeth and at 85 for the opposite side of the teeth. Through this procedure, the tooth normals along the mean line 82 to the pinion teeth can be matched to those of the gear so that the pinion tooth surface has the same pressure angle at any point of mean line 82 as the gear tooth surface has at the same point. The teeth in gear and pinion will then match along the whole length of the line 82 and bias bearing is avoided. This matching of the pressure angles depends on the angles between the lines 82 and 84, and 82 and 85, and on the tooth profile itself, particularly its curvature.

Now in the case of varying-leverage gears, we have to deal not with one but with two or more distinct profile curves per tooth side. There is a portion of the tooth shape which is much curved and a portion which is nearly flat. One portion requires a larger displacement of the cradle axis from the cone apex of the pinion and the other portion requires only a small displacement. This is true for each side of the teeth. The method of eliminating bias bearing, which is used in standard gears and which has been described, is not suitable, therefore, for varying-leverage gears. Nor is any other method, which has heretofore been employed for eliminating bias in the production of uniform motion gears, suitable for eliminating bias in the production of gears of varying-leverage.

I have found, however, that if varying-leverage gears are cut with a spherical cutter, they may be cut with tapering tooth depth and they will not have any bias bearing. This is because in the case of a spherical cutter the direction of the cutter axis does not affect the cutting surface. A sphere is defined completely by its radius and its center point, and can be described from axes passing in any and in all directions through said center point.

In the cutting of longitudinally curved tooth bevel gears of varying-leverage, then, it is preferred to use a spherical cutter and to cut the gears conjugate to a crown gear having spherical side tooth surfaces. This is illustrated diagrammatically in Figs. 6 and 7. Here 90 and 91 denote, respectively, the gear and pinion of a pair of varying-leverage gears made according to one embodiment of this invention. The axes of these gears are at 92 and 93, respectively, and 94 is the line of centers of the gears. The tooth surfaces of the gears are generated conjugate to a crown gear 95 whose opposite side tooth surfaces 96 and 97 are spherical. 100 and 101 denote, respectively, normals to the tooth surfaces 96 and 97 of the crown gear, respectively, at the points 102 and 103, and 98 and 99 denote, respectively, the centers of these spherical surfaces. The tooth surfaces of each gear 90 and 91 can be generated conjugate to the crown gear 95 by rotating a face-mill gear cutter having outside and inside spherical cutting edges centered at 98 and 99, respectively, in engagement with a gear blank while producing a relative rolling motion between cutter and blank at a varying ratio as though the blank were rolling with the crown gear 95 represented by the cutter. This will be described further later.

Fig. 6 shows the pair of gears 90 and 91 in mesh in a changeover position, that is, in a position where the torque ratio between the gears is at one extreme. In this position, the instantaneous axis of rotation of the gears is at 105. The other extreme position of the instantaneous axis is denoted by 104. It will be noted that in the position shown in Fig. 6, the tooth 106 of the gear 90 is not symmetrical with reference to the center line 94. The departure from symmetry in the design of the teeth is made in order to insure good meshing action on the two sides of the teeth when they are generated with a spherical cutter. The departure from symmetry may be made, therefore, to balance the minimum radii of curvature on the two sides of the teeth.

Fig. 6 shows the position of the gears where a tooth 106 of the gear 90 is nearly on center, with the instantaneous axis in its top position 105. Fig. 7 shows another position of the gears where they have rotated through half a pitch and a tooth 107 of the pinion is nearly on center with the instantaneous axis in its lowest position 104. The points of contact between the gear and pinion teeth are now at 108 and 109, and 110 and 111 are now tooth normals at the points of contact. These again intersect the line of centers 94 in the instantaneous axis which is now, as stated, at 104.

The crown gear 95 and the gears 90 and 91 have undulating pitch surfaces as determined by the shift of positions of the instantaneous axes. It will be noted, however, that in the case of the unsymmetrical teeth shown in Figs. 6 and 7, the undulations of the pitch surfaces may be unsymmetrical to the center lines of the gears in correspondence to the lack of symmetry of the teeth.

Figs. 8 and 9 illustrate diagrammatically one method of generating gears according to the present invention particularly with reference to the use of a spherical face-mill cutter as the generating tool. Preferably both sides of a tooth space of a gear are cut simultaneously. In Fig. 8 a spherical face-mill cutter 115 is shown positioned to cut the tooth surfaces of a pinion 116 whose opposite side tooth surfaces are denoted at 127 and 128 in Fig. 9. The cutter 115 has outside cutting profiles 117 and inside cutting profiles 118 whose centers are at 119 and 120, respectively, on the axis 121 of the cutter. The axis of the pinion is denoted at 122 and the axis of the mate gear is denoted at 129. The common apex of gear and pinion is denoted at 123.

In cutting the gear, the axis 125 of the generating crown gear is preferably positioned perpendicular to the root plane 130 of the gear.

In generating the pinion 116, the same basic generating gear may be used as for the gear, that is, the axis of the cradle may again be at 125. The cutter is preferably positioned, however, so that its projected axis 121 is perpendicular to the root plane 126 of the pinion. Each tooth surface of the pinion may be generated then, by rotating the cutter 115 on its axis 121 while the work 116 is rotated on its axis 122 at a uniform velocity and while a relative translatory movement is produced between the cutter and work at a varying velocity about the axis 125 of the basic generating crown gear. When a tooth surface or a pair of tooth surfaces is completed, the cutter is withdrawn from engagement with the blank and the blank is indexed. Then the cutter is fed back into engagement with the blank and the next tooth surface or pair of tooth surfaces generated etc.

The translatory movement may, of course, be imparted either to the work, or to the tool. In Fig. 9 the translatory movement is shown as imparted to the tool. Here 118', 118", 118''' and 118 denote four successive positions of the inside concave cutting edges of the tool as the work rotates on its axis. The corresponding positions of the cutter axis during this translatory movement of the cutter are denoted at 121', 121", 121''' and 121, respectively. The positions of the tooth surface of the pinion, which is being generated during this portion of the generating movement, are denoted at 128', 128", 128''' and 128, respectively. It will be noted that during this uniform rotation of the work, the cutter is moved at a varying velocity.

The pinion 116 shown in the drawing has unequal addendum and dedendum according to standard practice in the automotive field, the addendum of the pinion tooth being considerably greater than its dedendum. The whole tooth profile 128 will be rolled out when the axis of the cutter has moved to the position 121₁. The distances $a$, $b$, $c$, $d$, between successive positions of the cutter axis for equal angles of rotation of the work vary. The distances $c$ and $d$ may, however, be substantially equal on account of the rapid cycle of variation.

A gear conjugate to the pinion 116 may be generated by providing a cutter having spherical cutting edges of the same radii as on the mating tooth sides of the pinion teeth and using a basic member the same as for the pinion generation. The axis 125 of this basic member as already stated is preferably positioned perpendicular to the root plane 130 of the gear. The sphere centers of the cutter for cutting the gear should also be disposed in the same relationship with respect to the axis 125 as they were in the generation of the pinion, and the generating roll should be so modified from uniform roll as required to produce the desired profile shape.

Lengthwise mismatch of the mating tooth surfaces of the gear and pinion may be obtained by providing a smaller radius on the inside cutting surface of both gear and pinion cutter than is employed on the outside cutting surface of the cutter which produces the mating tooth side. Profile mismatch of the mating tooth surfaces may be obtained by positioning the cradle axis so that it includes a smaller angle with a line 129 perpendicular to the root plane 126 of the pinion than the angle between the axis 125 and this normal 129. When the two sides of the pinion are cut in separate operations, profile mismatch may also be obtained by modification of the generating roll. In a single-side cutting operation, the axis 125 of the cradle is frequently made perpendicular to the root plane of the pinion and parallel to the cutter axis.

When the two sides of both members of the pair are cut simultaneously, the root lines produced usually do not pass exactly through the common cone apex of the two members, but a tooth is produced which is deeper at the large end and shallower at the small end than a standard tooth. Where large pressure angles are employed, however, the increase in tooth depth at the large end is slight and of no practical disadvantage.

While the invention has been described in connection with different embodiments, it will be understood that it is capable of still further modification and this application is intended to cover any variations, uses, or adaptations of the invention following, in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. A pair of varying-leverage gears, each member of which has tooth profiles that have distinctly different portions of small and large curvature, respectively, the portion of each profile which is of smallest radius of curvature being located near the pitch line of the gear.

2. A pair of varying-leverage gears, each member of which has tooth profiles that have distinctly different portions of small and large curvature, respectively, the portion of each profile which is of smallest radius of curvature being located near the pitch line of the gear and the portions above and below said portion of small radius being less curved than said pitch line portion.

3. A pair of varying-leverage bevel gears which have longitudinally curved teeth and tooth profiles that have distinctly different portions of small and large curvature, respectively, the mating tooth surfaces of the two members of the pair having different radii of lengthwise tooth curvature.

4. A varying-leverage gear, each of whose tooth profiles adjacent the pitch line of the gear is more curved than an involute profile of the same pressure angle, and above and below said more curved portion is less curved than the involute profile.

5. A varying-leverage gear that has an undulatory pitch surface, the pitch of whose undulations is equal to the pitch of the gear teeth, and that has side tooth surfaces conjugate to spherical surfaces.

6. A varying-leverage bevel gear having side tooth surfaces which are conjugate to spherical tooth surfaces and whose profiles have distinctly different portions that are of small and large curvature, respectively.

7. A pair of varying-leverage bevel gears, which have longitudinally curved teeth, opposite side tooth surfaces of each member of the pair being conjugate to concave and convex spherical surfaces, respectively, that have different sphere radii, the tooth profiles of each member of the pair having distinctly different portions of small and large curvature, respectively.

8. A pair of varying-leverage bevel gears which have longitudinally curved teeth whose opposite side tooth surfaces are conjugate, respectively, to convex and concave spherical surfaces of different radii of curvature, each of the profiles of the teeth of said gears having distinctly different portions of small and large curvature, respectively, the portion of each profile which is of the smallest radius of curvature being located near the pitch line of the gear.

9. A pair of varying-leverage gears whose tooth profiles have distinctly different portions of small and large curvature, respectively, and whose teeth are unsymmetrical with reference to lines connecting the axes of the two gears.

10. A pair of varying-leverage gears whose tooth profiles have distinctly different portions of small and large curvature, respectively, and whose teeth are unsymmetrical with reference to lines connecting the axes of the two gears, the portions of the tooth profiles which are of smallest radius of curvature being located near the pitch line of each gear.

11. A pair of varying-leverage gears whose teeth are longitudinally curved and whose mating tooth surfaces have different radii of lengthwise curvature, the profiles of the tooth surfaces being differently curved in different portions of the tooth heights.

12. A varying-leverage gear whose side tooth surfaces have profiles that are differently curved in different portions of the tooth heights and whose opposite side tooth surfaces are conjugate to a basic gear whose side tooth surfaces are of circular arcuate profile shape.

13. A mating gear and pinion having tooth profiles including curves of action and outer tooth profiles of such shape that the common normal to their mating curves of action at their point of contact will cross the line of centers of the gears at a different point for different positions of the gears, and the same points will be simultaneously crossed by the common normal to a simultaneously mating curve of action and outer tooth profile.

14. A mating gear and pinion having tooth profiles including curves of action and outer tooth profiles, of such shape that the common normal to an outer tooth profile and its mating curve of action will pass through the same point in the line of centers of the gear and pinion that the simultaneous common normal to the mating curves of action at their point of contact passes, and wherein said point shifts substantially along said line of centers with rotation of said gears.

15. A mating pair of variable leverage gears having tooth profiles including curves of action and outer tooth profiles, of such shape that for each relative position of meshing engagement of the gears a point on each side of the profile of one tooth will substantially engage a point on each of the adjacent profiles of the mating teeth of the other gear, and wherein common normals to the profiles at each contact point will intersect at a point in the line of centers of the gears, said point shifting substantially along said line of centers with rotation of said gears.

16. A pair of varying leverage bevel gears which have longitudinally curved teeth whose tooth profiles are differently curved in different portions of the tooth heights, the mating tooth surfaces of the two gears having different radii of lengthwise tooth curvature.

17. A pair of varying leverage bevel gears which have longitudinally curved teeth whose side tooth surfaces are tangent at mean points in their lengths to lines drawn radial of the gear apexes, the profiles of the tooth surfaces being differently curved in different portions of the tooth heights.

18. A pair of varying leverage bevel gears which have longitudinally curved teeth whose side tooth surfaces are tangent at mean points in their lengths to lines drawn radial of the gear apexes, the profiles of the tooth surfaces having distinctly different portions of small and large curvature, respectively, the portion of each profile, which is of smallest radius of curvature, being located near the pitch line of the gear.

19. A pair of varying leverage bevel gears which have longitudinally curved teeth whose side tooth surfaces are tangent at mean points in their lengths to lines drawn radial of the gear apexes, opposite side tooth surfaces of each member of the pair being conjugate to concave and convex spherical surfaces, respectively, that have different sphere radii, the tooth profiles of each member of the pair being differently curved in different portions of the tooth heights.

ERNEST WILDHABER.

REFERENCES CITED

The following references are of record in the file of this patent:

UNITED STATES PATENTS

| Number | Name | Date |
|---|---|---|
| 2,009,915 | Davis | July 30, 1935 |
| 2,114,793 | Bauersfeld | Apr. 19, 1938 |